United States Patent [19]
Kakii et al.

[11] Patent Number: 4,729,624
[45] Date of Patent: Mar. 8, 1988

[54] FERRULE FOR OPTICAL CONNECTOR

[75] Inventors: Toshiaki Kakii; Koichiro Matsuno; Shuzo Suzuki, all of Yokohama, Japan

[73] Assignee: Sumitomo Electric Industries, Ltd., Osaka, Japan

[21] Appl. No.: 786,599

[22] Filed: Oct. 11, 1985

[30] Foreign Application Priority Data

Oct. 25, 1984 [JP] Japan .................. 59-225469

[51] Int. Cl.⁴ .................................................. G02B 6/36
[52] U.S. Cl. .................................. 350/96.20; 428/379
[58] Field of Search ............. 350/96.20, 96.21, 96.22, 350/96.34, 96.23; 428/372, 376, 379, 398, 367

[56] References Cited

U.S. PATENT DOCUMENTS

| | | | |
|---|---|---|---|
| 4,186,999 | 2/1980 | Harwood et al. | 350/96.21 |
| 4,195,045 | 3/1980 | Mead | 350/96.21 X |
| 4,456,653 | 6/1984 | Rüegg et al. | 428/379 |
| 4,505,979 | 3/1985 | Rüegg et al. | 428/379 |
| 4,512,630 | 4/1985 | Runge | 350/96.21 |
| 4,629,286 | 12/1986 | Fuse et al. | 350/96.23 |

FOREIGN PATENT DOCUMENTS 0040174 11/1981 European Pat. Off. .
3141377  5/1983 Fed. Rep. of Germany .
57-186708 11/1982 Japan ........................... 350/96.20

OTHER PUBLICATIONS

Patent Abstracts of Japan, vol. 7, No. 231 (P-229) [1376], Oct. 13, 1983; & JP-A 58 118 615.
Patent Abstracts of Japan, vol. 7, No. 105 (P-195) [1250], May 7, 1983; & JP-A-58 27112.
Plastics Engineering, vol. 39, No. 1, Jan. 1983, pp. 39-42, Manchester, New Hampshire, U.S.: S. R. Gerteisen et al "Carbon-Reinforced Thermoplastics: What They Offer, How to Process Them".

*Primary Examiner*—John Lee
*Attorney, Agent, or Firm*—Cushman, Darby & Cushman

[57] ABSTRACT

A ferrule for an optical connector made of a resin composition comprising a resin and carbon fiber as a filler having larger flexural strength and small mold shrinkage factor. The ferrule has a metal tube around its body that is embedded in its flange portion for added flexural rigidity.

3 Claims, 7 Drawing Figures

FERRULE FOR OPTICAL CONNECTOR

FIELD OF THE INVENTION

The present invention relates to a ferrule for an optical connector, which is used for positioning and fixing an optical fiber. More particularly, the present invention is related to a ferrule for an optical connector made of a resinous composition comprising a resin and a filler.

BACKGROUND OF THE INVENTION

A ferrule for an optical connector is an important element of the optical connector used in optical communication to position and fix an optical fiber.

A typical resinous ferrule has a cross section as shown in FIGS. 1A or 1B. The ferrule 3 of FIG. 1A is wholly made of a resin while a part of the outer periphery of that of FIG. 1B is surrounded by a metal tube 4. In these figures, numerals 1 and 2 stand for a coated optical fiber and an optical fiber, respectively.

The conventional resinous ferrule is made by molding an epoxy resin containing glass fiber or silica. For example, Japanese Patent Kokai Publication (unexamined) No. 97014/1983 discloses a ferrule for an optical connector made of an epoxy resin containing minute balls of quartz glass in an amount of 30 to 80% by weight. Japanese Patent Kokai Publication (unexamined) No. 176012/1982 discloses molding of a ferrule from a resin containing glass fiber.

Further, Report No. 2234 (1984) in the National Meeting of the Denki Gakkai (Electric Society) (entitled "Reliability of Single Core Connector for Direct Connection of Coated Optical Fiber") describes the use of an epoxy resin for enclosing LSI, in which silica is used as a filler.

However, the conventional resinous ferrules for the optical connector have several drawbacks.

The first drawback is their poor reliability. When, as shown in FIG. 3, the flange portion is fixed in a bed and flexural load F is applied at the upper end of the ferrule 3 at a rate of 50 mm/min., the ferrule is broken at the load of 3.3 kg in average. This fracture strength is less than a fourth of that of a metal ferrule for an optical connector. Therefore, the resinous ferrule has poor reliability such that it is broken when extraordinary force is applied on it during attaching or detaching the optical connector.

The second drawback is inferior accuracy of an outer diameter of the ferrule during molding of the resinous ferrule. An accuracy of the outer diameter of the ferrule should be very strict and is required to be in a range of ±0.001 mm. However, the molding of the resin is inevitably accompanied with thermal expansion or shrinkage when cured. This is expressed by a mold shrinkage factor. For example, when an article having a diameter of 2.499±0.001 mm is molded from a resin having a mold shrinkage factor of 0.5%, an inner diameter of a mold should be 2.512 mm. If the mold shrinkage factor varies by 10%, the outer diameter of the molded article does not fall within 2.499±0.001 mm. Since the mold shrinkage factor is related to various factors such as molding conditions and a kind of the resin to be molded, it is difficult to precisely control the mold shrinkage factor. Thus, it is highly desired to offer a resin having a small mold shrinkage factor so that its variation does not affect the accuracy of the dimensions of the article.

SUMMARY OF THE INVENTION

One object of the present invention is to provide a resinous ferrule for an optical connector, which has large flexural strength and also small mold shrinkage factor.

Another object of the present invention is to provide a resinous ferrule for an optical connector a part of an outer periphery of which is made of a metal tube firmly adhered to the resinous body.

According to the present invention, there is provided a ferrule for an optical connector made of a resinous composition comprising a resin and carbon fiber as a filler.

DETAILED DESCRIPTION OF THE INVENTION

Figure 4:
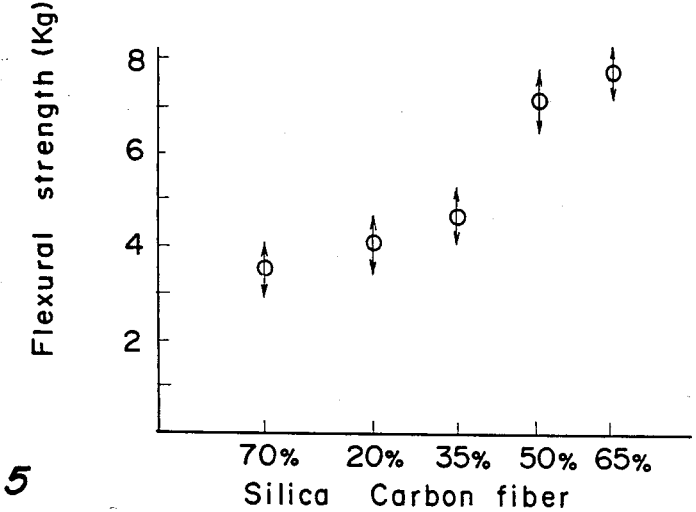
FIGS. 4 and 5 are graphs showing flexural strength and mold shrinkage factor of various ferrules for an optical connector, respectively.
Figure 5:
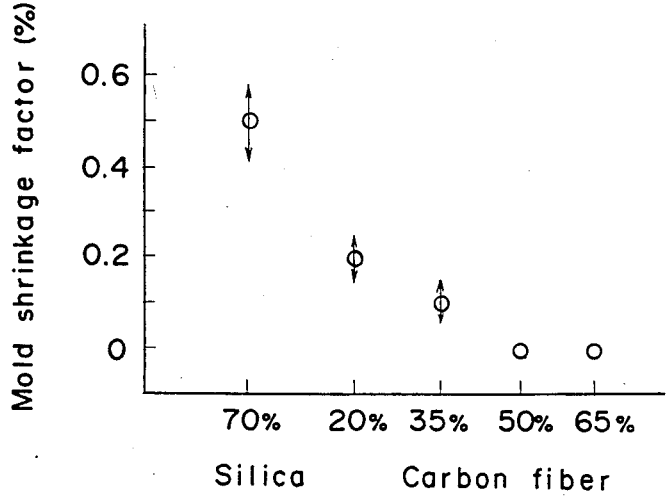

Carbon fiber to be used as a filler according to the present invention has tensile strength of 250 to 350 kg/mm$^2$ and Young's modulus of $30 \times 10^3$ to $40 \times 10^3$ kg/mm$^2$, which are far superior to conventionally used fillers such as glass fiber and silica. When an epoxy resin containing 50% by weight of carbon fiber is compared with the same resin containing 70% by weight of silica, flexural strength of the former is more than two times better than that of the latter and the mold shrinkage factor of the former is less than 0.1% which is less than one fifth of that of the latter as shown in FIGS. 4 and 5.

Figure 1A:
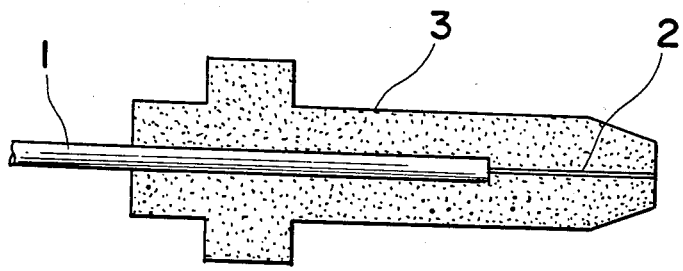
FIGS. 1A and 1B are cross sections of resinous ferrules.
Figure 1B:
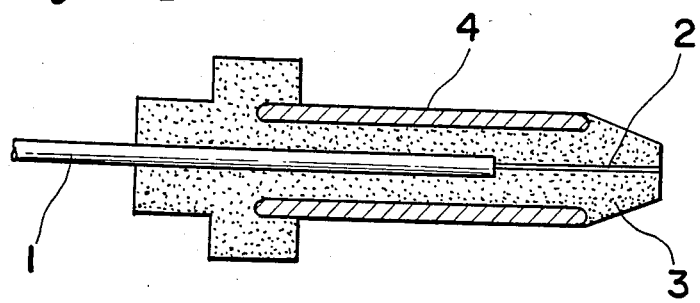

When, as shown in FIG. 1B, at least a part of the outer periphery of the ferrule 3 of the invention is surrounded by a metal tube 4, not only the flexural strength is improved but also various inherent drawbacks of the conventional resinous ferrule for optical connectors are overcome. For example, dimensional change due to moisture absorption and separation of the metal tube from the resinous body due to the mold shrinkage factor of the resin are prevented by the combination of carbon fiber filled resin and the metal tube.

As shown in FIG. 1B, a part of the metal tube is embedded in the flange portion of the ferrule so as to further increase flexural strength of the ferrule.

If the amount of carbon fiber is too large, the mold shrinkage factor may be decreased, this being inadvantageous when releasing the molded ferrule from the mold. In such case, the mold should be slightly tapered towards its bottom. However, when the metal tube surrounds the outer periphery of the ferrule, the molded ferrule is always smoothly released from the mold.

Since the molding resinous composition containing glass fiber or silica as a filler has a mold shrinkage factor of 0.4 to 0.6%, the metal tube surrounding the ferrule tends to be separated. Therefore, the adhesiveness between the resin and the metal tube should be improved by some measure. On the contrary, the mold shrinkage factor of the resinous composition containing carbon fiber can be reduced to 0.2% or less and in some cases to 0 (zero) % or negative, practically, the metal tube is hardly or never separated from the resin surface. In addition, by making a coefficient of thermal expansion of the resin smaller than than of the metal tube, long term reliability of the ferrule is achieved and the separation of the metal tube caused by heat cycle is prevented.

Further, the coefficient of thermal expansion of the resinous composition is preferably the same as or smaller than that of the metal tube to improve the adhesiveness between them.

Two types of the ferrules of FIGS. 1A and 1B are proposed. The structure of the ferrule may be selected from them according to its end use. While the ferrule of FIG. 1 is used when only a ferrule having better strength and molding stability than the conventional one is required, the complex type ferrule of FIG. 1B is used when a ferrule having excellent strength and reliability is required. The ferrule of the invention can be used not only for a single core optical fiber but also a multi core optical fiber.

The structure of the ferrule of the invention may be modified according to its application. As the resin, any thermoplastic or thermosetting resin may be used. In addition to carbon fiber, conventionally used glass fiber or silica may be added.

The metal tube may be made of any metal, preferably stainless steel. To improve the adhesiveness of the metal tube, at least one of the outer and inner surfaces of the tube may be roughened.

The sizes of the ferrule of the invention may be the same as those of the conventional one.

The present invention will be hereinafter explained further in detail by following examples, in which % is by weight unless otherwise indicated.

EXAMPLE 1

Figure 2A:
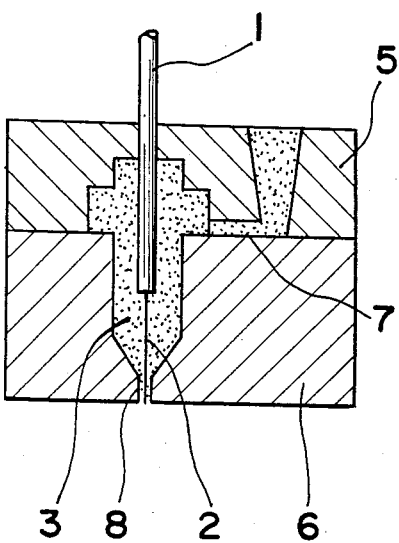
FIGS. 2A and 2B illustrate processes for molding a ferrule for an optical connector.

As a resinous composition, an epoxy resin containing 20, 35, 50 or 65% of carbon fiber having a diameter of 7 μm and a length of 1-2 mm was used. The resinous comosition was transfer molded by means of a pair of molds shown in FIG. 2A consisting of an upper mold 5 and a lower mold 6. A coated optical fiber 2 from one end of which a part of the covering was peeled off was inserted in an orifice 8 for positioning the optical fiber in the lower mold 6 and then the resinous composition was filled in the cavity of the molds. The molding conditions and the structure of the mold, particularly a gate 7 are to be optimized based on the amount of carbon fiber. For example, the molding conditions for the epoxy resin containng 35% of carbon fiber are as follows:

| Pressure: | 85 kg/cm$^2$ |
| --- | --- |
| Temperature: | 160° C. |
| Molding time: | 5 minutes |

The produced ferrule had following dimensions:

| Length: | 14 mm |
| --- | --- |
| Diameter of the body: | 2.299 mm |
| Diameter of the flange: | 4.5 mm |

The thus molded ferrule was tested on its fluxural strength and mold shrinkage factor. The results are shown in FIGS. 4 and 5.

For comparison, an epoxy resin containing 70% of silica powder was used to produce a ferrule for optical connector and tested on its flexural strength and mold shrinkage factor. The results are also shown in FIGS. 4 and 5.

EXAMPLE 2

Figure 2B:
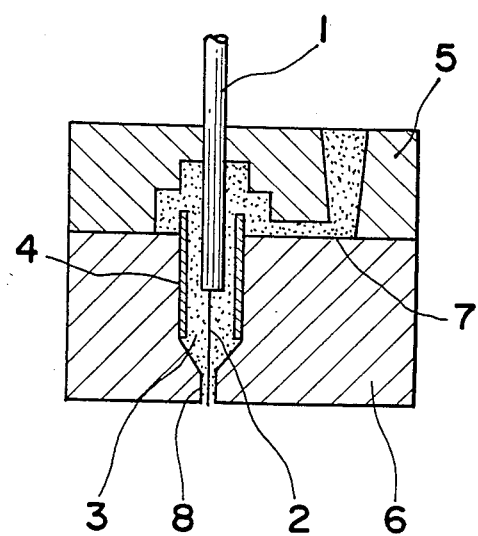
Figure 3:
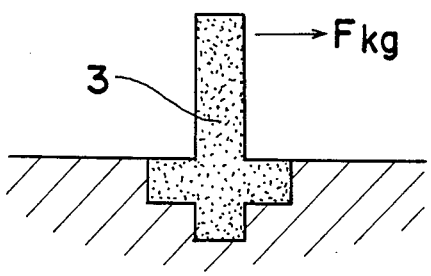
FIG. 3 illustrates a manner for testing flexural strength of a ferrule.

In the same manner as in Example 1 but placing a metal tube having an outer diameter of 2.498±0.001 mm in the mold as shown in FIG. 2B, a ferrule was molded. The amount of carbon fiber was 35%.

The flexural strength of the ferrule with the metal tube was about 12 kg, which is about 3.6 times stronger than that of the ferrule made of the epoxy resin containing silica and about 2.7 times stronger than that of the ferrule made of the epoxy resin containing 35% of carbon fiber.

EXAMPLE 3

Two types of the ferrules produced in Examples 1 and 2 were tested on their connection loss. After 50 times connection, the average loss of the ferrules produced in Examples 1 and 2 was 0.42 dB and 0.39 dB, respectively. In both cases, the maximum connection loss was 0.53 dB and 0.50 dB and very stable.

To test the reliability of the ferrule, it was subjected to 20 heat cycles of $-30-+70°$ C./8 hours. The connection loss of both ferrules was not changed.

EXAMPLE 4

20 ferrules were made in the same manner as in Example 2 and subjected to 60 heat cycles of $-40-+80°$ C./8 hours. Then, all the ferrules were cut to inspect the presence of separation between the resin and the metal tube. Any separation of the order of 1 μm was not found in all the ferrules.

For comparison, 20 ferrules were produced from an epoxy resin containing 70% of silica powder and subjected to the same heat cycle test as above. In all the ferrules, the metal tube was separated with about 5 μm gap from the resin.

EXAMPLE 5

A ferrule of FIG. 1B made of an epoxy resin containing carbon fiber and having a coefficient of thermal expansion of $14\times10^{-6}$ and a metal tube having a coefficient of thermal expansion of $17\times10^{-6}$ was subjected to a heat shock test comprising immersing the ferrule in a dry ice/methanol mixture ($-70°$ C.) for 5 minutes and a hot water ($+70°$ C.) for 5 minutes. After 30 cycles, no separation appeared.

EXAMPLE 6

Ten ferrules were molded from epoxy resin containing 35% of carbon fiber in the same manner as in Example 1. The maximum release force was 4.6 kg. On the contrary, when the same resinous composition was molded together with a metal tube in the same manner as in Example 2, the release force was only about 1.2 kg.

EXAMPLE 7

40 composite ferrules were produced from an epoxy resin containing 35% of carbon fiber in the same manner as in Example 2 and kept at 60° C. and 95% RH for 500 hours. The dimensional change of all the ferrules was less than 0.5 μm.

For comparison, 40 composite ferrules were produced from an epoxy resin containing 70% of silica powder in the same manner as in Example 2 and kept under the same conditions as above for 500 hours. The maximum size change was 2.5 μm.

What is claimed is:

1. A ferrule for an optical connector having a flange portion, which is made of a resinous composition comprising a resin and carbon fiber as a filler, wherein at least part of the outer surface of said ferrule is surrounded by a metal tube, one end of which is embedded in the flange portion, one end of said ferrule protruding from the end of the metal tube that is not embedded in said flange portion, whereby a ferrule having increased flexural strength is provided.

2. A ferrule according to claim 1, wherein a coefficient of thermal expansion of the resinous composition is the same as or smaller than that of the metal tube.

3. A ferrule according to claim 1, wherein a mold shrinkage factor of the resinous composition is not larger than 0.2%.

* * * * *